United States Patent
Viaud (10) Patent No.: US 7,404,283 B2
(45) Date of Patent: Jul. 29, 2008

(54) CROP COLLECTING ASSEMBLY FOR AN AGRICULTURAL HARVESTER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 848 days.

(21) Appl. No.: 10/885,247

(22) Filed: Jul. 7, 2004

(65) Prior Publication Data

US 2005/0028509 A1 Feb. 10, 2005

(30) Foreign Application Priority Data

Aug. 6, 2003 (EP) ................................. 03017913

(51) Int. Cl.
*A01B 73/00* (2006.01)
(52) U.S. Cl. .............................. 56/228; 56/15.5; 56/364
(58) Field of Classification Search .................... 56/341, 56/14.9, 15.1, 15.2, 15.3, 15.5, 15.9, 159, 56/192, 228; 172/311
See application file for complete search history.

(56) References Cited

U.S. PATENT DOCUMENTS

| | | | | |
|---|---|---|---|---|
| 2,262,906 A | * | 11/1941 | Raney et al. | ................... 56/125 |
| 3,345,808 A | * | 10/1967 | Van Der Lely | ........... 56/10.2 R |
| 3,468,107 A | * | 9/1969 | Van Der Lely | ................ 56/11.9 |
| 4,084,394 A | * | 4/1978 | van der Lely | ................ 56/14.6 |
| 4,270,339 A | | 6/1981 | Wolfe | |
| 4,409,780 A | * | 10/1983 | Beougher et al. | ............. 56/228 |
| 4,487,004 A | * | 12/1984 | Kejr | ........................... 56/14.4 |
| 4,910,946 A | | 3/1990 | Underwood | |
| 5,609,523 A | * | 3/1997 | Ringwald et al. | ........... 460/119 |
| 5,671,595 A | | 9/1997 | Buermann | |
| 5,673,543 A | * | 10/1997 | Richardson et al. | ............ 56/85 |
| 6,681,551 B1 | * | 1/2004 | Sheidler et al. | .......... 56/10.2 G |
| 2002/0059787 A1 | | 5/2002 | Viaud | |

FOREIGN PATENT DOCUMENTS

DE 43 41 610 A 6/1995
EP 0 640 277 B1 8/1994

* cited by examiner

*Primary Examiner*—Thomas B Will
*Assistant Examiner*—Alicia Torres (57) ABSTRACT

A crop collecting assembly includes a first collecting unit located between a pair of further collecting units. All of the units operate to gather crop from the ground and feed it to the rear where it may fall to the ground or enter a harvesting machine, such as a self-propelled baler, for further processing. At least one of the further collecting units is adjustable laterally so as to be spaced from the first collecting unit, and a crop-transferring bridging element is provided in the space between the two units for receiving crop from the further collecting unit and delivering the received crop to the first collecting unit.

30 Claims, 9 Drawing Sheets

CROP COLLECTING ASSEMBLY FOR AN AGRICULTURAL HARVESTER

FIELD OF THE INVENTION

The invention relates to a crop collecting assembly comprising at least two collecting units, a first one of which is connectible to a harvesting machine for delivering the collected crop and at least an further one which is connected to the first one in a relatively moveable manner as well as to an agricultural harvester being equipped with such a crop collecting assembly.

BACKGROUND OF THE INVENTION

U.S. Pat. No. 4,910,946 discloses an extensible combine header for harvesting small grain. Lateral header units are telescopically moveable with respect to a center unit. To allow a transportation of the cut crop as well as extension and retraction of the header, overlapping housing parts are provided and the auger core is formed like a telescope, whereas the auger flights are substantially loose and flexible on the core. Extension and retraction are accomplished by hydraulic cylinders.

It is known from EP A1 640 277 to combine three pick-up units to a single crop collecting assembly, whereas the pick-up units are vertically moveable with respect to each other and can be driven independent of each other and depending on a sensed velocity of a harvesting vehicle. The outer pick-up units can be tilted upwardly to assume a transport position. Furthermore the pick-ups can be of the tine or of the belt type, whereas the belt may be flexible enough to allow said movement of the outer pick-up units. The collected crop is fed to a downstream baler.

The problem to be solved by this invention is seen in that said known pick-up can be operated only if windrows maintain always a given distance to each other.

SUMMARY OF THE INVENTION

The present invention relates to crop collecting assemblies, and more specifically relates to such assemblies as are used together with agricultural harvesters.

An object of the invention is to provide a crop collecting assembly constructed of multiple collecting units including some which are movable laterally within a range and further including a bridging element operable in a gap between separated collecting units.

By means of this teaching the lateral position of the further collecting unit(s) can be varied and adapted to the position of the windrow to be picked up. The collected crop can be delivered to the first collecting unit via the bridging element. Adaptation of said bridging element may happen by its installation or by taking it away, which is possible if the distance between the windrows differs from field to field but is uniform within the same field. Adaptation may also happen by an extension or retraction of a bridging element being variable in length. The collecting units are provided with collecting means, which need to extend over the width of the windrow only as opposed to a small grain platform which uses cutting elements over its entire width. The number of further collecting units depends on the capacity of the harvesting machine to which the collecting assembly is attached and/or on the intended working width. Under normal circumstances one further collecting unit may be provided at each side of the first and then center collecting unit. However one further collecting unit would be sufficient as well. In an extreme case, which may become relevant in the future, more than one further collecting units may be provided on one or both sides of the first collecting unit. Accordingly the number of bridging elements may raise as well.

The further collecting units can be easily attached to a harvesting machine and still have a high degree of freedom for movement with respect to other components or collecting units if they are carried by the support.

The ways to move the further collecting unit(s) laterally are not limited to special solutions. But the most efficient ones and easiest to reduce to practice are a telescopic arm, a fixed arm with a moving carrying element or like a scissor. An arm of fixed length and a moving carrying element maybe in the form of a rack and pinion or of a friction wheel.

If the further collecting unit(s) can pivot or tilt about a horizontal axis in the direction of operation it can easily follow the ground contour, either by using skid plates or wheels or in a remote controlled manner. Of course following the ground contour can apply also to the first collecting unit.

Having a tilt or pivot possibility about a horizontal axis extending transverse to the travel direction enables the support and the collection units attached to it to adjust the working angle with respect to the ground, which assists in aligning with different tire sizes, hitch lengths, etc.

The provision of a vertical and/or horizontal pivot axis in the support allows to pivot the further collecting unit(s) into a transport position upwardly, i.e. perpendicular to the ground, along the travel direction, i.e. perpendicular to the first collecting unit in a horizontal plane or on top of the first collecting unit. This will enable the collecting assembly to assume an overall transport width within the limit for road transportation, e.g. within 2.5 to 3.00 or 3.5 m.

Bringing the collecting assembly into a transport position is eased and good visibility for the operator is retained if the first collecting unit is raised and the further collecting unit(s) is/are swung underneath of them. This is the preferred method in a case, in which at least one further collecting unit is used on each side of the first collecting unit.

If it is necessary only to adjust the distance between the collecting units once, a bridging element of fixed length or various bridging elements of different lengths may be used which are inserted or not. This will help also, to move the lateral further collection units closer to the inner first collecting unit when the collecting assembly is converted into its transport state. Connecting the bridging element to the support is advantageous since this is the strongest part which also can easily hold actuators and connecting elements. However, if the bridging element is attached to the first and normally center collecting unit they may even help to gather a very wide center windrow whereas no outer further collecting unit(s) is/are needed. In case the bridging element can be extended transverse to the direction of operation in a more or less step less manner, it makes sense, to make the bridging element part of the further collecting unit, since this contains wide guide elements and conveying augers which can be formed as a telescope.

The transfer of crop may happen in a passive way, if the distance between both collecting units is quite short; it may be accomplished by active conveying means, if the distance is bigger and/or the crop is difficult to transport.

A bridging element of fixed length, which in the simplest way is a bent sheet metal, is sufficient, if the distance between the windrows during a longer period of work, for example on a big field, will not change.

A bridging element of variable length makes sense, where the distance between the windrows changes on one field or if the fields to be harvested are quite small, or if it is necessary to reduce the width of the collecting assembly for other reasons, e.g. to avoid hitting an obstacle.

One way to achieve adjustability of the length of the bridging element is to use an auger with a telescopic auger core or auger tube and with flights on it, which are fixed to the free end of the inner auger core only, whereas they are loose and flexible in their remaining area. Such an auger design is known from U.S. Pat. No. 4,910,946.

Another way to provide for flexibility and adjustability is the use of a belt, which is trained about rolls, the position of which related to each other can be changed. If the belt is flexible enough, either by internal strength or by flexible connecting means only one moveable roll may be needed. If the belt is stiff and inflexible a third roll may be used to create a loop, the length of which determines the working length of the belt. Idler rolls may be provided laterally to said third roll.

In order to assure that the crop reaches the first collecting unit and does not fall onto the ground, an extensible guide is provided for example in the form of flat or bent sheets, which overlap each other comparable to a telescope, and allow thus a relative movement between the first and the further collecting unit(s). Means may be provided to assure that the guides remain in close contact, when they are moved.

If the bridging element is connected to at least one side of the first collecting unit, it can remain fixed at it even if the further collecting unit is not used, for example because it is in its transport position. Meanwhile the bridging element may enlarge the working width of the first collecting unit.

Although it would be possible to use individual collecting units in the form of corn harvesting units, best advantage is obtained, if the collecting units are in the form of a tine pick-up or a belt pick-up with or without lateral feeding assisters and with a lateral conveyor, since their position needs to follow a windrow on the ground.

The use of ground engaging wheels avoids that the collecting unit(s) drop into a ditch or hit a ground mount. Ground engaging wheels also assist in taking up part of the weight of the collecting assembly.

In order to assure that the crop is delivered without problems from the further collecting unit(s) to the first collecting unit, the delivery place and the receiving place need to match. For example, if an overshot conveyor auger feeds an undershot auger, they need to be located in different heights.

In order to make best use of the flexibility of the collecting assembly a control device is provided. Said control device is particularly an electronic control device, having sensors to detect and/or control the position of the further collecting unit(s) with respect to a windrow laying on the ground and/or to detect and/or to control the height of the collecting unit with respect to the ground and/or to detect and/or control the position between the collecting units. These sensors are useful to move the further collection unit(s) laterally with respect to the operating or driving direction such that it is always in line with the windrow. With the other sensors it is possible to avoid that the tines of the pick-up hit the ground and catch ground or that they are too high and do not catch all crop. Finally other sensors detecting the position between the collecting units may assist in bringing the whole collecting assembly into a transport position without interfering with each other.

By adjusting the drive speed of the collecting units according to the amount of crop gathered and/or to the operating speed of the collecting assembly it is possible to provide for an even feeding which results in a smooth operation without considerable load peaks.

A further sophistication of the invention is achieved, if the collection units can be driven independent of each other. First, this will allow to individually adjust their receiving capacity to the true volume and speed; second it allows to switch off a collecting unit completely, for example if it is in a transport position.

Cost reduction is achieved if the device to control the position of the further collecting unit(s) is also used to control the speed of the collecting units. A common control unit also avoids interfaces and thus the risk of data losses and the like.

The use of a cutting unit downstream of the delivery end of the first collecting unit assists in optimizing the crop flow and in achieving a high density of the crop in a downstream crop processor like a baler. The knives of the cutting unit may be provided in an upper or in a lower position depending on the direction of rotation of a rotor in the cutting device. The knives can assume an operating position or a non-operating position, in which they are not needed.

In a case, in which a conveyor of the first collecting unit has stub augers, between which the cutting unit is arranged and whereas a lost space is provided at the stub augers and the cutting unit, the bridging element can be moved into said lost space and assume a transport position there. This will also help to reduce the overall dimensions of the collecting assembly. Such a lost space could be provided in the area between the shorter cutting device and the longer collecting unit.

While such an inventive collecting assembly may be attached to a tractor or a dedicated vehicle and just produces a consolidated big windrow, it is preferred to use said collecting assembly on a forage harvester or on a baler, since those can further process the collected crop directly.

If a self-propelled baler is equipped with a crop collecting assembly and if a power source is arranged laterally or at the rear of an operator's cab or between the front ground engaging wheels, sufficient space remains to transport the crop between the collecting assembly to a bale chamber. Transport may happen by means of transporting belts, rollers, augers or the like. Other crop processing units, like a chopper, a bagger, a conditioner, a wrapper or the like may be used on said self-propelled vehicle, too or instead of.

If the baler is of the type disclosed in European patent application EP-A1-1 264 532, the result will be a light vehicle with the need of little power for operation. Other suitable balers would be those disclosed in EP-A1-1 264 532.

Instead of making the cutting unit part of the collecting assembly it also can be part of the agricultural harvesting machine and can be provided at a considerable distance to the first crop collecting unit and downstream an intermediate conveyor.

If the self-propelled baler is provided with a wrapping system, e.g. to hermetically cover silage with plastic and if an unloading device is provided, such a vehicle is useful for contractors since it fulfills all needs and can produce a high output.

BRIEF DESCRIPTION OF THE DRAWINGS

The following drawings disclose several embodiments of the invention.

DESCRIPTION OF THE PREFERRED EMBODIMENT

Figure 1:
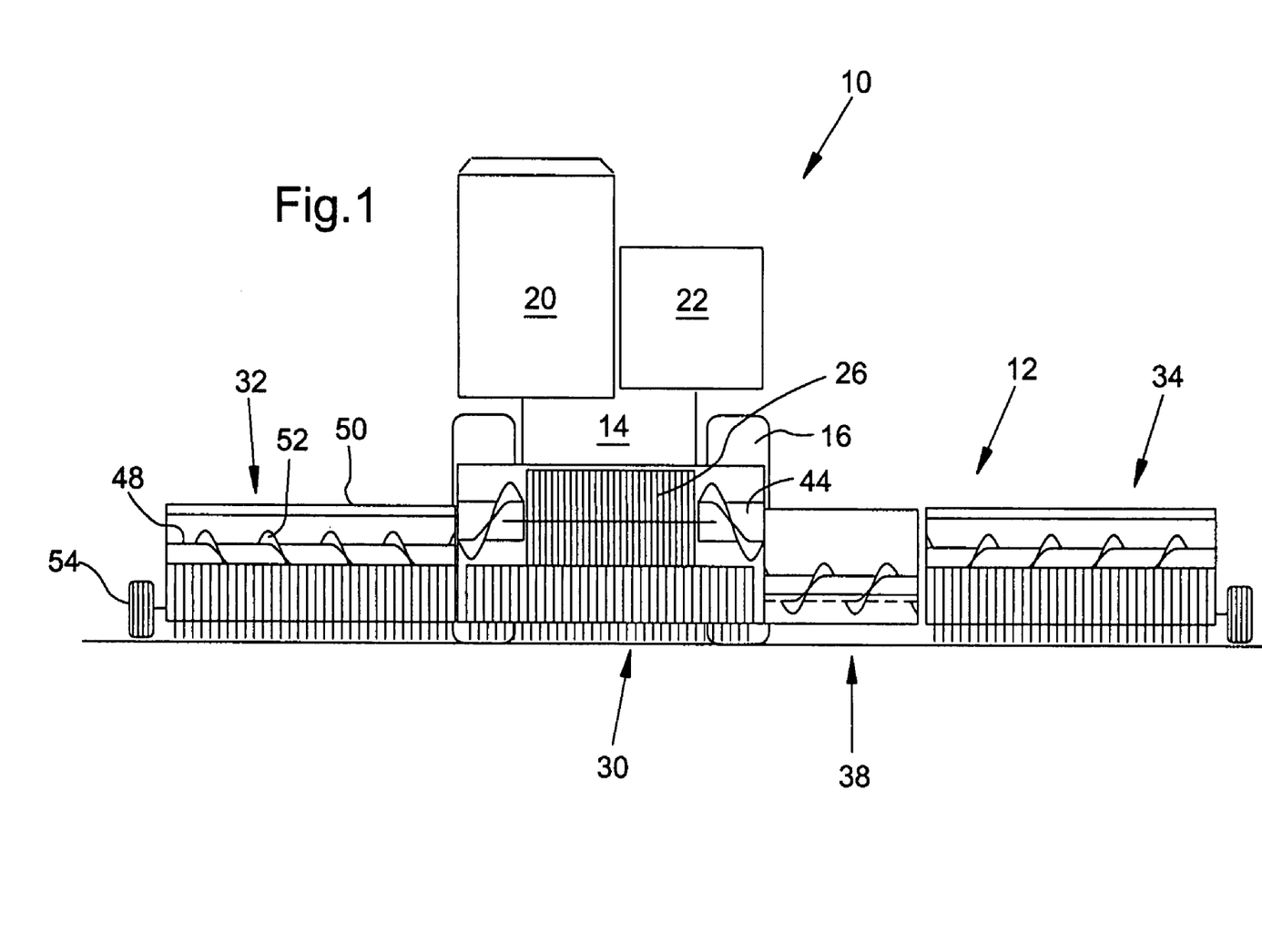
FIG. 1 is a schematic front view of a harvesting machine having a crop collecting assembly in an operation mode.

FIG. 1 shows a harvesting machine 10 having a crop collecting assembly 12, substantially for use in agriculture.

The harvesting machine 10 in this embodiment is of the self-propelled type, which in general can be a modified self-propelled forage harvester, a mower or a combine, but as well a dedicated vehicle for the purpose described below. Alternatively the harvesting machine 10 could be of the pulled-type. The main purpose of the harvesting machine 10 is to carry the collecting assembly 12 during operation, a sub-purpose is to process the collected crop.

While in each shown embodiment the harvesting machine 10 has a chassis 14, front wheels 16, rear wheels 18, an operator's cab 20 and a power source 22, it is provided also with a baler 24 (FIG. 3), representing any suitable type of a crop processing unit, a cutting unit 26 and conveyors 28 in some examples shown.

Figure 2:
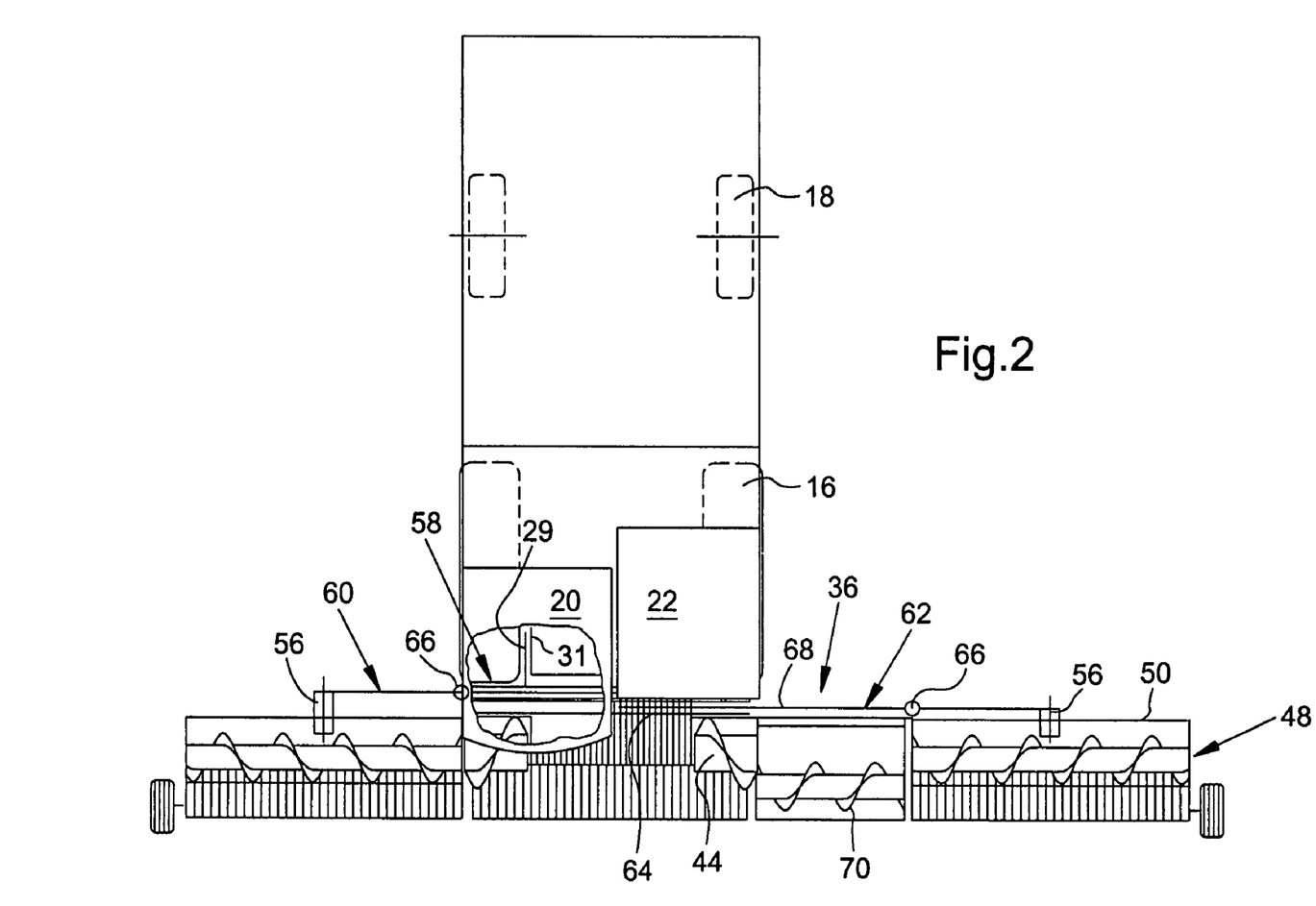
FIG. 2 is a top view of the harvesting machine of FIG. 1.

The chassis 14 is provided at its front end with a hitch 29 or the like (FIG. 2), which as such is known in the art and which serves to connect the crop collecting assembly 12 to the harvesting machine 10 and move it vertically for operation or transport. Beyond that, the chassis 14 carries the operator's cab 20, the power source 22, the eventual baler 24, the eventual cutting unit 26 and the eventual conveyors 28.

The front wheels 16 and the rear wheels are of the type one may find at a combine or forage harvester., i.e. big and fixed at the front and small and steerable at the rear.

Figure 6:
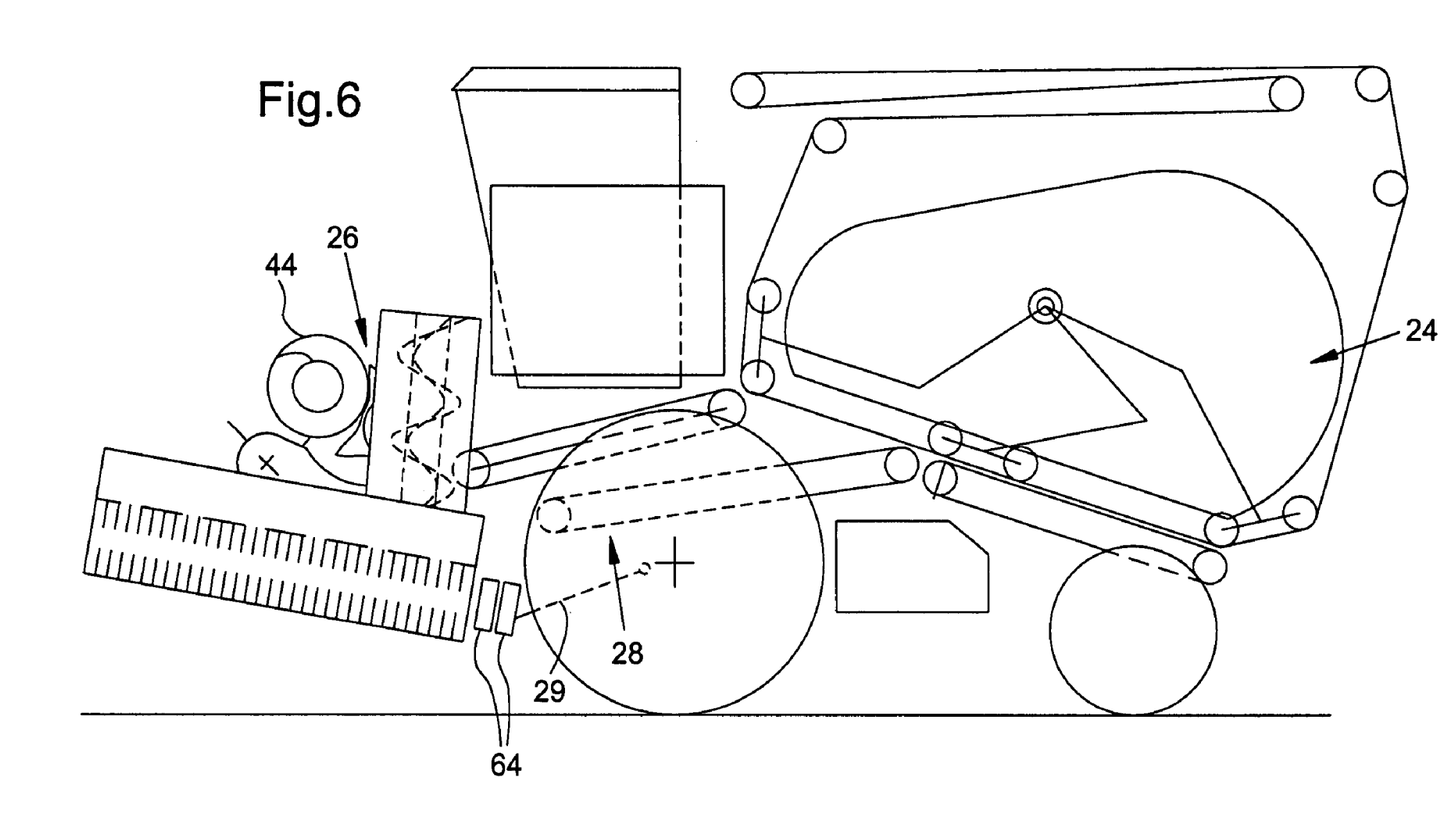
FIG. 6 is a left side view of the harvesting machine of FIG. 4.
Figure 7:
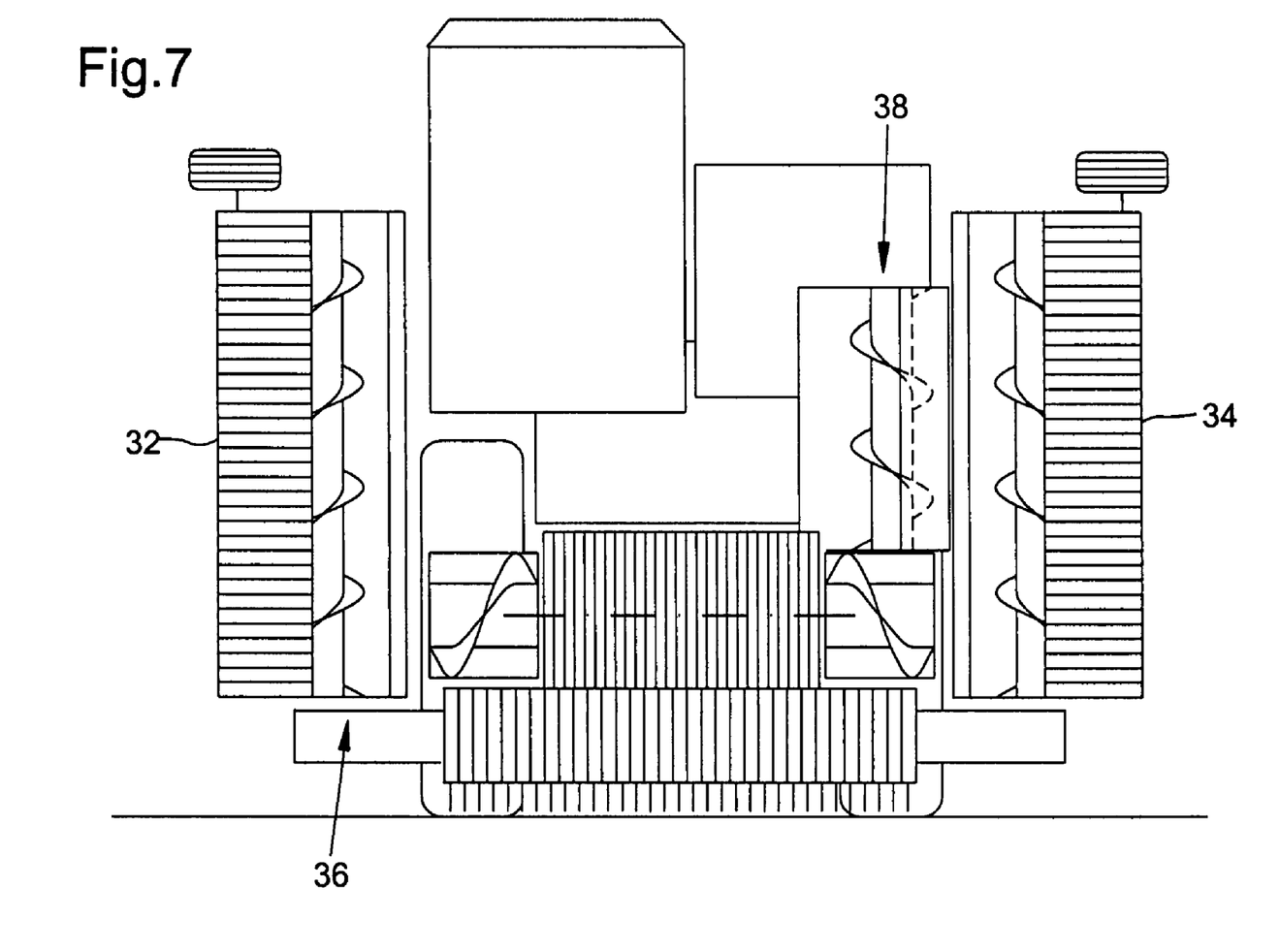
FIG. 7 is a front view of a harvesting machine having a crop collecting assembly according to a second embodiment.
Figure 8:
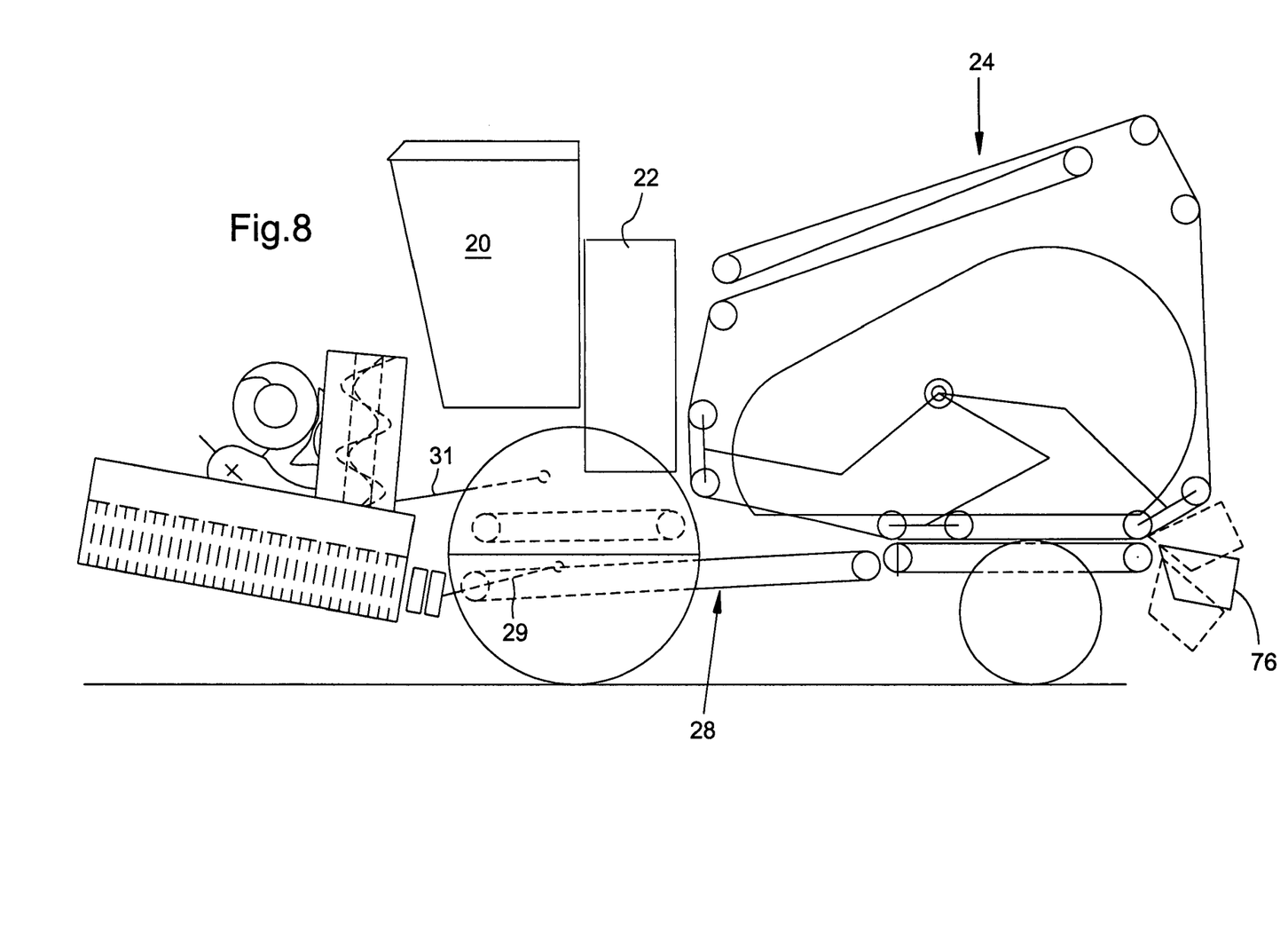
FIG. 8 is a left side view of the harvesting machine similar to FIG. 6, however with a power source located behind an operator's cab.
Figure 9:
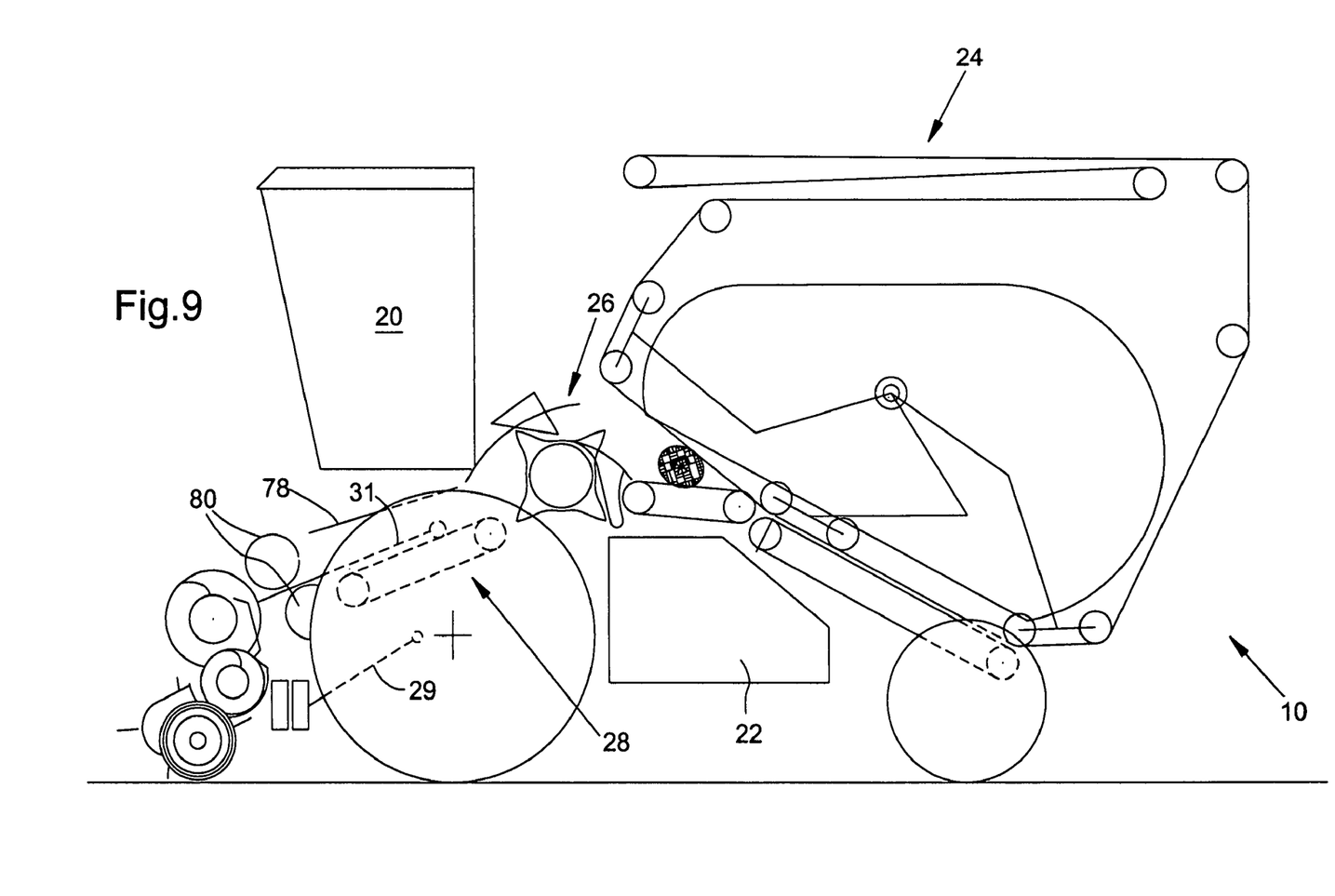
FIG. 9 is a left side view of the harvesting machine similar to FIG. 6, however with a power source located between the front and rear axles.

The operator's cab 20 and the engine 22 are as well of the ordinary type and may be arranged side by side as in FIGS. 1 to 7 or in the fore and aft direction as in FIGS. 8 and 9. If they are arranged side by side, it may happen as it is shown, i.e. the cab is on the right and the engine on the left side, or vice versa.

The baler 24 is substantially of the type disclosed in EP-A1-1 264 532. However, this is not necessary, but only advantageous. More or less each convention baler, round or rectangular, could be used, if any.

Also the cutting unit 26 is of the type well-known from balers or loading wagons and may be operated in undershot or overshot manner. Any of the known devices to replace, sharpen, adjust and control the knives may be used in this cutting unit 26. Except in FIG. 9, the cutting unit 26 can also be part of the crop collecting assembly 12 instead of the harvesting machine 10.

The conveyor 28 as shown in FIGS. 3, 6, 8 and 9 is composed of contrary running driven belts transporting the crop between themselves between the crop collecting assembly 12 and the baler 24 or any other crop processing unit.

The crop collecting assembly 12 could in general be referred to as a very wide pick-up, suitable for road transportation, which in an operation mode considerably extends over the harvesting machine 10 at least on one side. In this embodiment the crop collecting assembly 12 contains a center collecting unit 30, a right hand collecting unit 32 and a left hand collecting unit 34, at least some of which are carried by a support 36. In this embodiment, only the outer units are carried by the support 36. Between the center collecting unit 30 and the left hand collecting unit 36, a bridging element 38 is provided. The terms "right" and "left" have to be understood from the point of view of an operator in the operator's cab 20 looking in the forward drive direction.

The crop collecting assembly 12 is used to pick-up crop from the ground over its full width and to deliver it in a mat downstream the center crop collecting unit 30. Since the crop collecting assembly 12 is too wide for road transportation it is formed to be foldable at the interfaces between them such, that the outer or further collecting units 32, 34 can be swung upwardly or forwardly.

While in this embodiment the both further collecting units 32, 34 can be moved laterally with respect to the center crop collecting unit 30, other applications may require, that only the right hand or left hand crop collecting unit 32 or 34 is in a laterally fixed relationship to the center crop collecting unit 30. In today's environment the width of the crop collecting assembly 12 may reach or even exceed 9 meters. All crop collecting units 30-34 are of about the same width.

The hitch 29 can be composed of upper and lower links like on a tractor three point hitch, or it can be sort of a housing pivoting about a single shaft like the feeder house of a combine or a forage harvester.

The center crop collecting unit 30 is of the type known in the art, i.e., it contains a plurality of upwardly rotating tines 40 between strippers 42, downstream of which is provided a conveyor 44 formed as two lateral stub augers to move the received crop to a center outlet opening 46. The stub augers, as the conveyor 44 will be called hereinafter, transport in an undershot manner. The cutting unit 26 is located between the stub augers 44 and upstream of the outlet opening 46 in FIGS. 1-8 to reduce the length of the crop before it is dropped to the ground or further processed in the harvesting machine 10. The center crop collecting unit 30 is not wider than permitted by road transportation regulations. Although the center collecting unit 30 could be attached to the support 36 as well, it is connected to the harvesting machine 10 in this embodiment by means of a hitch 31, which could be formed similar to the hitch 29, but with different attaching points.

The right crop collecting unit 32, i.e., the one to the right of the longitudinal axis seen in the forward driving direction, also comprises similar tines 40 and strippers 42. Instead of stub augers 44 a conveyor 48 in the form of an auger is provided which extends over the full width of the crop collecting unit 32 and the lower half of which is located slightly below the upper surface of the strippers 42. The conveyor 48 will be called an auger hereinafter. A wall 50 is provided behind the auger 48. Flights 52 of the auger 48 are directed such, that the auger 48 provides for an overshot delivery of the crop to the center crop collecting unit 30. The orientation of the auger 48 and of the adjacent stub auger 44 is such, that the upper flight portion of the overshot auger 48 feeds into the lower flight portion of the undershot stub auger 44. This assures a crop handover without crop jam. At the right hand of the right hand crop collecting unit 32 a ground engaging support wheel 54 is provided. At the rear of wall 50 a pivot 56 is provided, which allows a tilting movement of the crop collecting unit 32 about a horizontal axis extending in the driving direction. The tines 40 and the strippers 42 of the center and the right hand crop collecting unit 30 and 32 are in line with each other, when in operation mode.

The left hand crop collecting unit 34 is made in a mirror image of the right hand collecting unit 32.

While it is not described, it is obvious that mechanical, hydraulic or electric drives are provided to move the tines 40, stub augers 44 and the augers 48 in the appropriate direction and speed—variably or fixed.

The support 36 has a central frame 58, a right hand support element 60 and a left hand support element 62 forming a single assembly, which can be attached to the hitch 29 at the front end of the harvesting machine 10. The support 36 serves to carry the outer collecting units 32, 34 and is provided to the rear of them.

The central frame 58 is formed such, that it has an opening located in line with the outlet opening 46, and that, at the rear, it has connection points for the aforesaid hitch 29 on the harvesting machine 10. In other embodiments the support 36 could carry all collecting units 30-34. Furthermore, the central frame 58 has a horizontally and laterally extending guide 64, which slideably receives the support elements 60, 62. This guide 64 extends below the outlet opening 46 and receives the support elements 60, 62 in a positively locking manner as in a telescope or the like. The guide 64 and the support elements 60, 62 are dimensioned such that they can compensate the weight of the respective outer crop collecting unit 32, 34 even in an extended position. A joint 66 having a vertical pivot axis is provided at about two third of the length of the support elements 60, 62, such that it lies immediately at the side of the central frame 58, when the support element 60, 62 is fully retracted.

In the embodiment of FIGS. 1-6, the central collecting unit 30 is connected to the chassis 14 by means of the hitch 31 in a vertically moveable manner, e.g., by means of a vertically oriented slide, a vertically pivotable hitch or the like, such that it can be raised above the outer collecting units 32, 34. In FIG. 7, the lateral crop collecting units 32, 34 are swung upwardly into their transport position and it is not necessary to have a device lifting the center collecting unit 30 above the outer ones.

The pivot 56 is provided to support the respective crop collecting unit 32, 34 with respect to the central frame 58. The pivot 56 allows the crop collecting unit 32, 34 to tilt vertically with respect to the support element 60, 62 to follow the ground contour. This tilting movement may be controlled by not shown springs, hydraulic or pneumatic dampeners, or resistors. The joint 66 permits the support elements 60, 62 to swing forwardly underneath the center crop collecting unit 30, when this is raised into its transport position. The position between the support elements 60, 62 and the central frame 58 is controlled by a motor or linkage (not shown) from a control system or manually. The motor or linkage may include locking means as well as breakaway means or overload safety means. In the operation mode, the support elements 60, 62 and the central frame 58 assume the position shown in FIG. 2, in which they are inline.

The support elements 60, 62 each contain a slide 68 which is attached at one end to the joint 66 and which is received with its opposite end in the guide 64. This slide 68 allows to overcome a distance between an outer collecting unit 32, 34 and the center crop collecting unit 30 determined by the bridging element 38. The slide 68 is moved in and out in the guide 64 by means of an motor, cable or linkage (not shown) such that the bridging element 38 either fits between the center collecting unit 30 and the outer collecting units 32, 34 or they come close to each other, if the bridging element 38 is not used. Also actuators (not shown) are provided to control the movement about the pivot 56 and/or the joint 66.

The bridging element 38 is provided as an option to allow the left hand crop collecting unit 34, or instead of, or in addition, the right hand crop collecting unit 32 to be away from the center crop collecting unit 30 a certain distance, which allows to pick up windrows lying on the ground with a big distance between each other. The bridging element 38 bridges the gap between an outer and the center crop collecting unit 32, 34 and 30 at least such that crop does not fall onto the ground. Additionally, where needed, the bridging element 38 may be made as a conveyor actively moving the crop towards the center crop collecting unit 30, which is appreciated if the crop shows a high moving resistance. The bridging element 38 may be removed, if the windrows lie close to each other and/or swung into a transport position independent of an outer crop collecting unit 32, 34. Additionally the bridging element 38 may be of an extendible type, which can adjust to various distances between the outer or further collecting units 32, 34 and the center crop collecting unit 30; this will allow an adjustment of the crop collecting units 32, 34 and the possibly changing distance between the windrows on the go.

While many different ways to design such a bridging element 38 may be chosen as is mentioned in the introductory part of this patent application, the embodiments show only one using an overshot transporting conveyor 70 in the form of an auger, extending over the full length of the bridging element 38 and being driven. The overshot conveyor 70 receives crop from the auger 48 of the left hand crop collecting unit 34 and feeds it into the undershot conveying zone of the stub auger 44 on the center crop collecting unit 30. While such an auger type conveyor 70 may be of the ordinary type, it may also be of an extensible, telescopic like design, in which the flights are loose on an auger core, except at the ends. This conveyor 70 is driven preferably by a hydraulic motor (not shown), since this permits a relatively free movement of the bridging element 38 between its positions and since it allows to adjust the transportation speed to match the receiving or delivery speed. The bridging element 38 is supported by the central frame 58 or by the central crop collecting unit 30 and can be swung into an upright position above or behind the adjacent stub auger 44.

To the extent it has not been described so far, the following is a description of some unique features shown in various ones of the figures.

Figure 3:
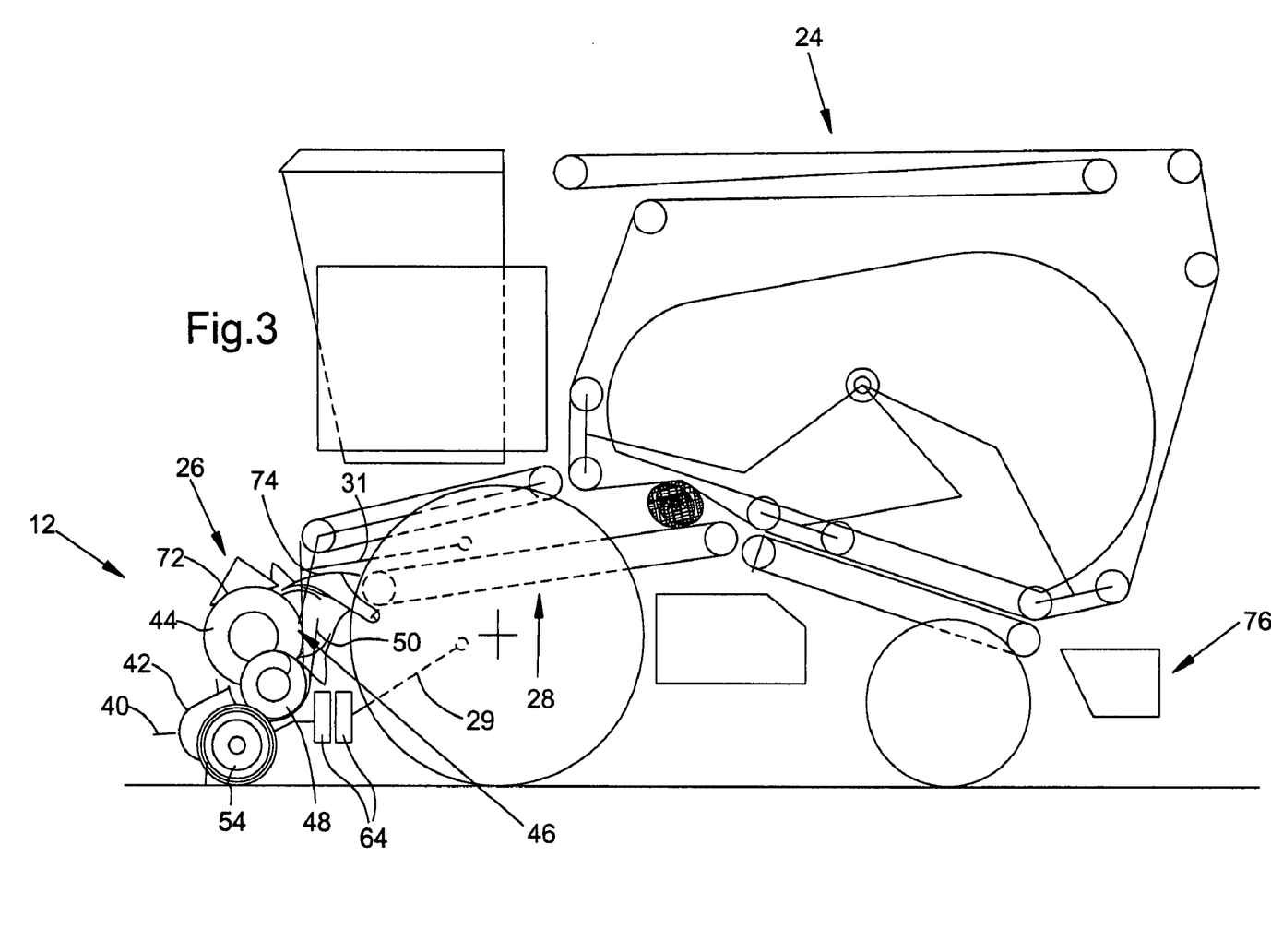
FIG. 3 is a left side view of the harvesting machine of FIG. 1.

FIG. 3 shows a crop collecting assembly 12 having a cutting unit 26 in an overshot cutting manner with knives 72 in an about 10'o clock position and strippers 74 in an about one o'clock position when looking onto FIG. 3. This cutting unit 26 feeds into the conveyor 28 provided downstream of it, which conveyor 28 delivers the crop underneath the operator's cab 20 and the power source 22 to the baler 24. At the delivery end of the baler 24 a bale wrapping device 76 is indicated, whereas a good possibility for a wrapping device 76 is disclosed in aforesaid patent application.

Figure 4:
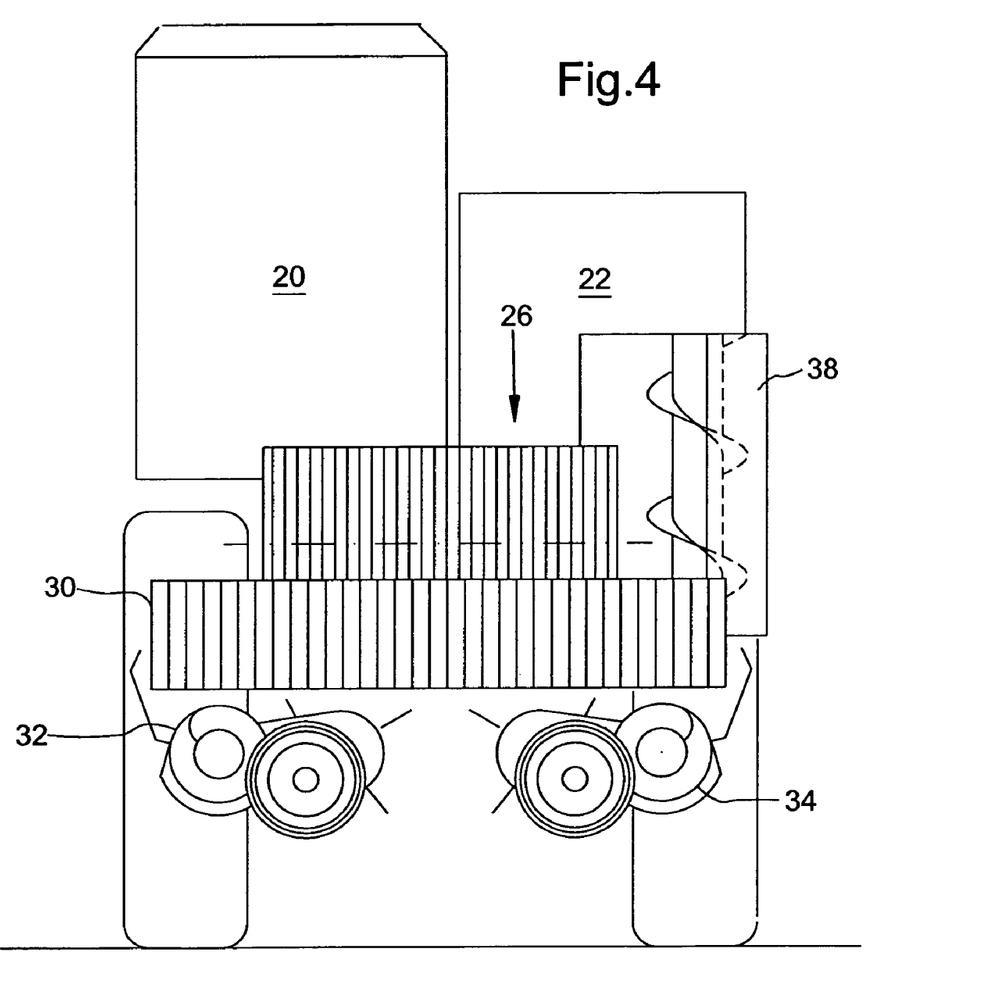
FIG. 4 is a front view of the harvesting machine, however, with the crop collecting assembly in a transport mode.

FIG. 4 shows the center collecting unit 30 in a raised position and the outer collecting units 32, 34 pivoted underneath of it. At the same time the bridging element 38 is pivoted into an upward position, but still remains substantially within the lateral extension of the center collecting unit 30 or of the harvesting machine 10. According to FIG. 4 the cutting unit 26 is substantially smaller than the center collecting unit 30, which provides for a lateral space into which the bridging element 38 fits.

Figure 5:
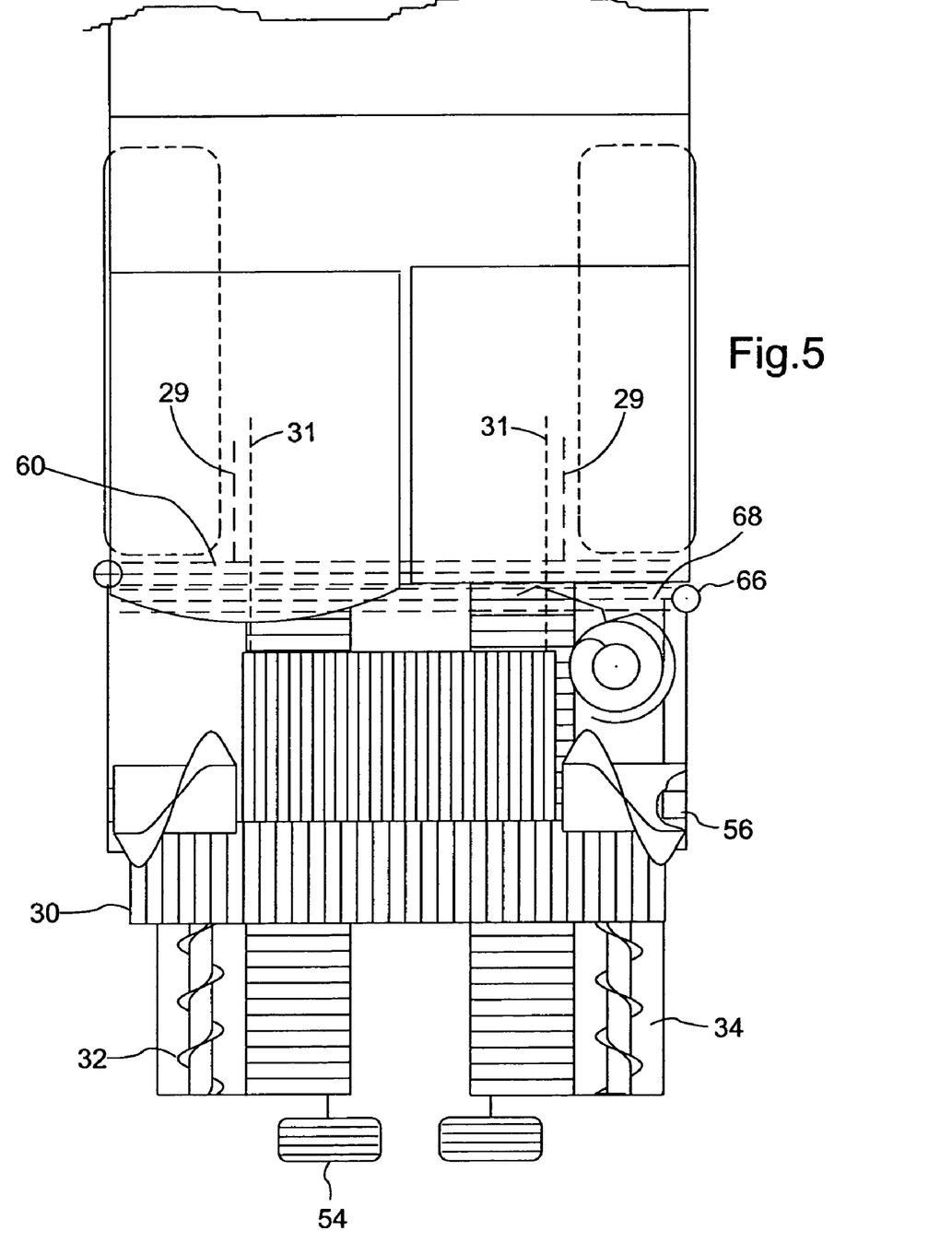
FIG. 5 is a top view of the harvesting machine of FIG. 4.

FIG. 5 shows the arrangement of FIG. 4 in a top view, whereas a rear portion of the harvesting machine 10 is omitted.

FIG. 6 shows the arrangement of FIG. 4 in a side view, whereas a rear portion of the harvesting machine 10 is equipped with baler 24, like in FIG. 3.

FIG. 7 shows an embodiment of the crop collecting assembly 12 which differs insofar from the crop collecting assembly 12 in FIGS. 1 to 6, as the outer collecting units 32, 34 are not pivoted in a horizontal plane to the front, but in a vertical plane upwardly. Compared with the embodiment in FIGS. 1 to 6 this means that the joint 66 having a vertical pivot axis is replaced by an invisible joint 66 having horizontal pivot axis—not shown. Support 36 with pivots 56 and support elements 60 and 62 will be used as well. This embodiment is useful only in cases, in which road regulations permit a wide vehicle, in which the harvesting machine 10 is less wide than those in FIGS. 1 to 6 or in which road transportation is not necessary at all. The possibility to move collecting unit 32 and/or 34 laterally to adjust to the location of the windrow remains unchanged. Furthermore the bridging element 38 can be used.

The harvesting machine in FIG. 8 differs from that shown in FIG. 6 in that the power source 22 is located behind the operators cab 20, which results in a lowered arrangement of the conveyor 28 and a less inclined orientation of the baler 24.

Finally FIG. 9 discloses a harvesting machine 10 having similar components as those described before but in a different arrangement. In this embodiment the conveyor 28 is shorter and has a lower band and a guide plate 78 in a certain distance above it. Feed rolls 80 are provided upstream of this conveyor, receive the crop from the crop collecting assembly 12 and feed into the conveyor 28 for further transportation towards the baler 24. Between the operators cab 20 and the baler 24 and above the power source 22, now between the axles of the front and rear wheels 16, 18, the cutting unit 26 operating in an overshot manner is provided. The cutting unit 26 delivers the cut crop—or if the knives are disengaged the non-cut-crop- to the baler 24, the pressing and rolling elements of which are adapted for that purpose.

An electronic control device is provided to control the height of the crop collecting assembly 12, the position of the outer collecting units 32, 34, the position of the bridging element 38, the direction and speed of the drive of the collecting units 30-34, the folding movements etc. etc. This control device includes not shown sensors, data processing units, actuators and other commonly used components.

Having described the preferred embodiment, it will become apparent that various modifications can be made without departing from the scope of the invention as defined in the accompanying claims.

The invention claimed is:

1. In a crop collecting assembly including coupling structure adapted for attachment to a harvesting machine and including at least first and second individual collecting units, with said first collecting unit including said coupling structure and being operable for delivering the collected crop to said harvesting machine, and said second collecting unit being coupled to said first collecting unit in a relatively moveable manner, the improvement comprising: said collecting assembly including a support carrying said second collecting unit in a laterally moveable manner within an operating range; and an adaptable bridging element mounted between said first and second collecting units and including a powered transverse conveyor for the transfer of crop from said second collecting unit to said first collecting unit.

2. The crop collecting assembly, as defined in claim 1, wherein said support includes at least one lateral support element; and said second collecting unit being mounted to said at least one lateral support element; and said at least one lateral support element being one of a telescopic arm, a fixed arm having a moving carrying element, or a scissor arrangement.

3. The crop collecting assembly, as defined in claim 1, wherein said second collecting unit is connectible to said support in a vertically tiltable manner about an axis extending in a direction of travel of said collecting assembly.

4. The crop collecting assembly, as defined in claim 1, wherein said second collecting unit is connectible to said support for pivoting about an axis extending transversely to a direction of travel of said collecting assembly.

5. The crop collecting assembly, as defined in claim 1, wherein said support is provided with a joint between said first collecting unit and said second collecting unit, with said joint defining one of a horizontal or a vertical pivot axis.

6. The crop collecting assembly, as defined in claim 1, wherein a lifting device is associated with said support, said first collecting unit and said second collecting unit and is operable for selectively swinging said second collecting unit underneath said first collecting unit for transport.

7. The crop collecting assembly, as defined in claim 1, wherein said bridging element is mounted to one of said support, said first collecting unit, or to said second collecting unit so as to be selectively inserted into a space between said first collecting unit and said second collecting unit.

8. The crop collecting assembly, as defined in claim 1, wherein said transverse conveyor of said bridging element is one of an auger, a belt, or wheels.

9. The crop collecting assembly, as defined in claim 1, wherein said bridging element is of fixed length.

10. The crop collecting assembly, as defined in claim 1, wherein said bridging element is of variable length.

11. The crop collecting assembly, as defined in claim 10 wherein said bridging element of variable length comprises an extendible conveyor defined by an auger with a telescopic auger core and flexible auger flights.

12. The crop collecting assembly, as defined in claim 10, wherein said bridging element of variable length comprises an extendible conveyor defined by a belt trained about rolls of which at least one is displaceable and wherein said belt has a variable effective length.

13. The crop collecting assembly, as defined in claim 10, wherein said bridging element of variable length comprises an extendible guide defined by overlapping sheets mounted for movement relative to each other.

14. The crop collecting assembly, as defined in claim 7, wherein said bridging element is attached to at least one side of the first collecting unit.

15. The crop collecting assembly, as defined in claim 1, wherein said collecting units are one of tine or belt pick-ups including lateral feeding conveyors.

16. The crop collecting assembly, as defined in claim 1, wherein said second collecting unit includes at least one ground engaging wheel.

17. The crop collecting assembly, as defined in claim 15, wherein said conveyor of said first collecting unit and said conveyor of said second collecting unit and/or said bridging element have delivery and receiving interfaces adjacent to each other.

18. The crop collecting assembly, as defined in claim 1, and further including an electronic control device having sensors to detect and/or control the position of said second collecting unit with respect to a windrow laying on the ground and/or to detect and/or to control the height of said collecting units with respect to the ground and/or to detect and/or control a lateral distance between said first collecting unit and said second collecting unit.

19. The crop collecting assembly, as defined in claim 1, and further including a variable speed drive arrangement coupled for driving said collecting units, with the drive speed of the collecting units being variable, in particular depending on an amount of collected crop and/or an operating speed.

20. The crop collecting assembly, as defined in claim 1, wherein a drive arrangement is coupled to said first and second collecting units; and said drive arrangement being constructed so as to permit said first and second collecting units to be driven independent of each other.

21. The crop collecting assembly, as defined in claim 1, and further including a drive arrangement coupled to said collecting units, a sensor arrangement mounted to said crop collecting assembly for sensing various working parameters of said collecting assembly, and a control device coupled to said drive arrangement and said sensor arrangement so as to control the operation of said drive arrangement in response to sensed parameters of said collecting assembly.

22. The crop collecting assembly, as defined in claim 1, wherein said first collecting unit includes a cutting unit having one of an undershot or overshot rotor and knives for selectively cutting the collected crop.

23. The crop collecting assembly, as defined in claim 15, wherein said lateral conveyor of said first collecting unit is defined by stub augers; said first collecting unit further including a cutting unit located between said stub augers.

24. In a combination of an agricultural harvester being one of a baler, a forage chopper, a bagger or a wrapper, and a collecting assembly for delivering crop to a crop processor of said harvester, the improvement comprising: said collecting assembly including a coupling structure coupling said collecting assembly to said harvester and including at least first and second collecting units; said first collecting unit including said coupling structure and being operable for delivering collected crop to said harvester; a support coupling said second collecting to said first collecting in a laterally moveable manner for adjusting the spacing between adjacent sides of said first and second collecting units, within an operating range; and an adaptable bridging element mounted between said first and second collecting units and including a transverse conveyor for the transfer of crop from said second collecting unit to said first collecting unit.

25. The combination, as defined in claim 24, wherein said harvester is a self-propelled baler.

26. The combination, as defined in claim 25, wherein said self-propelled baler includes an operator's cab located directly rearward of a region occupied by said first collecting unit; and a power source being arranged one of laterally of, or at the rear of, said operator's cab.

27. The combination, as defined in claim 25, wherein said self-propelled baler includes front and rear pairs of ground wheels; and said baler includes a power source located in a region between said front and rear pairs of ground wheels.

28. The combination, as defined in claim 27, wherein said baler includes a baling chamber; and said power source being located beneath said baling chamber.

29. The combination, as defined in claim 25, wherein said baler includes a baling chamber spaced rearwardly from said first collecting unit; a cutting device being located for feeding cut crop into said baling chamber; and a conveyor mounted for receiving crop from said first collecting unit and delivering it to said cutting device.

30. The combination, as defined in claim 25, wherein said baler includes a baling chamber; and at least one of a wrapping device or unloading device being mounted at the rear end of the baling chamber.

* * * * *